US012767308B2

(12) United States Patent
Oshita et al.

(10) Patent No.: US 12,767,308 B2
(45) Date of Patent: Oct. 20, 2026

(54) ELECTRICALLY POWERED WATERCRAFT

(71) Applicant: HONDA MOTOR CO., LTD., Tokyo (JP)

(72) Inventors: Yuki Oshita, Saitama (JP); Shin Miura, Saitama (JP); Fumiyoshi Kambara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 678 days.

(21) Appl. No.: 18/189,747

(22) Filed: Mar. 24, 2023

(65) Prior Publication Data

US 2024/0317377 A1 Sep. 26, 2024

(51) Int. Cl.

*B63H 21/17* (2006.01)
*B60L 50/60* (2019.01)
*B63H 21/00* (2006.01)
*B63H 21/36* (2006.01)

(52) U.S. Cl.

CPC .............. *B63H 21/17* (2013.01); *B60L 50/66* (2019.02); *B63H 21/24* (2013.01); *B63H 21/36* (2013.01); *B60L 2200/32* (2013.01)

(58) Field of Classification Search

CPC ........ B63H 21/17; B63H 21/24; B63H 21/36; B63H 20/007; B60L 50/66; B60L 2200/32; B63B 34/10

See application file for complete search history.

(56) References Cited

U.S. PATENT DOCUMENTS

| | | | | |
|---|---|---|---|---|
| 9,919,784 B1 * | 3/2018 | Fisher | H02J 7/02 |
| 2011/0244739 A1 * | 10/2011 | Daikoku | B63H 21/17 440/6 |
| 2015/0259033 A1 * | 9/2015 | George | B63H 5/07 440/6 |
| 2023/0249795 A1 * | 8/2023 | Breyer | B63H 23/34 440/6 |
| 2024/0429527 A1 * | 12/2024 | Bernier | B60L 50/64 |

FOREIGN PATENT DOCUMENTS

| | | | |
|---|---|---|---|
| CN | 106275343 A * | 1/2017 | H01M 8/188 |
| GB | 2630658 A * | 12/2024 | B63H 20/007 |

* cited by examiner

*Primary Examiner* — Andrew Polay
(74) *Attorney, Agent, or Firm* — Armstrong Teasdale LLP

(57) ABSTRACT

An electrically powered watercraft, comprising a hull (1), a propulsion device (2) provided at a stern of the hull and including a motor (10) and a propulsion unit (11) driven by the motor, an electrical box (6) that is placed on one side of a rear part of the hull and houses an electric component therein, a battery box (5) for housing a battery for supplying electric power for driving the motor, the battery box being positioned at a predetermined distance in front of the electrical box, a first cable (6) extending from the battery box to the electrical box, and a second cable (7) extending from the electrical box to the motor.

18 Claims, 14 Drawing Sheets

ELECTRICALLY POWERED WATERCRAFT

TECHNICAL FIELD

The present invention relates to electrically powered watercraft, and in particular to electrically powered watercraft having an improved wiring arrangement.

BACKGROUND ART

In recent years, active efforts have been made toward the realization of a low-carbon society or a decarbonized society, and research and development efforts are being directed to electric propulsion devices that reduce CO2 emissions and improve energy efficiency for use in various vehicles including land vehicles, aircraft, and watercraft.

Electrically powered watercraft is provided with a battery box and an electrical box housing a power control unit and other electric components, in addition to a propulsion unit such as an outboard motor. In a limited space of watercraft, such as small boats fitted with an electric outboard motor, it is important to position such components and devices within the hull in an advantageous manner. In particular, the wiring arrangement is highly important for the ease of operation and maintenance of the watercraft.

SUMMARY OF THE INVENTION

In view of such a problem of the prior art, a primary object of the present invention is to provide electrically powered watercraft having an improved wiring arrangement.

To achieve such an object, the present invention provides an electrically powered watercraft, comprising: a hull (1); a propulsion device (2) provided at a stern of the hull and including a motor (10) and a propulsion unit (11) driven by the motor; an electrical box (5) that is placed on one side of a rear part of the hull and houses an electric component therein; a battery box (4) for housing a battery for supplying electric power for driving the motor, the battery box being positioned at a predetermined distance in front of the electrical box; a first cable (6) extending from the battery box to the electrical box; and a second cable (7) extending from the electrical box to the motor.

Thereby, by separately forming the battery box and the electrical box, the battery box and the electrical box can be arranged such that the operation and maintenance of the watercraft can be performed in a favorable manner without impeding the movement of people on board in the limited space of the watercraft. In particular, the cables can be arranged in a compact manner while allowing the propulsion device to be swung sideways for steering purpose without causing any undue strain to the cables and without cluttering the surrounding area of the propulsion device with the cables.

Preferably, in this electrically powered watercraft, a substantially closed box-shaped storage compartment (3) is provided in the rear part of the hull, and accommodates the electrical box therein, and the first cable and the second cable are passed through a hole (30) formed in a wall of the storage compartment.

Thereby, the electrical box is protected from water, and the two cables extending from the electrical box can be passed through the same hole provided in the storage compartment.

Preferably, in this electrically powered watercraft, the first cable and the second cable extend forward from the hole, and an end of the second cable on a side of the propulsion device extends forward from the propulsion device.

Thereby, the second cable extending between the electrical box and the propulsion device is given with a U-shaped bend so that the movement of the propulsion device for steering and tilting purposes is prevented from causing any undue strain to the second cable.

Preferably, in this electrically powered watercraft, an end of the second cable on a side of the electrical box extends rearward from a rear end of the electrical box.

Thereby, the second cable can be arranged in a particularly compact manner.

Preferably, in this electrically powered watercraft, the hole is provided in a top wall of the storage compartment, and fitted with an inverted J-shaped or inverted U-shaped tubular member (31) provided on an upper wall of the storage compartment.

Thereby, the second cable is prevented from interfering with the operation of the propulsion device, and the storage compartment containing the electrical box is favorably prevented from the intrusion of water and other foreign matter.

Preferably, in this electrically powered watercraft, the hole is provided in a front wall of the storage compartment, and fitted with a downwardly open L-shaped or J-shaped tubular member (40) provided on a front wall of the storage compartment.

Thereby, the second cable is prevented from interfering with the operation of the propulsion device, and the storage compartment containing the electrical box is favorably prevented from the intrusion of water and other foreign matter.

Preferably, in this electrically powered watercraft, the first cable extends from a high position on an outboard side of the battery box.

Thereby, since the first cable is positioned well above the floor of the watercraft, the first cable is protected from water, and from being trampled by an occupant.

Preferably, in this electrically powered watercraft, the battery box has an open bottom and a vertical wall (18) provided on an outboard side of the battery box, and an end of the first cable on a side of the battery box passes under the vertical wall, and is retained on an outboard surface of the vertical wall.

Since the bottom end of the battery box is open, and spaced from the floor of the hull, the battery is protected from water that may be deposited on the floor.

Preferably, in this electrically powered watercraft, the battery box has a battery receiving opening (13) facing an inboard side of the hull, and a door (16) that is configured to be opened and closed about an axis extending along an upper edge of the battery receiving opening.

Since the battery box is accessed from the inboard side, and fitted with a door, the battery is protected from water that may be splashed upon the battery box.

Preferably, in this electrically powered watercraft, the electrical box and/or the battery box has legs (17, 27) for separating a bottom end thereof from a floor of the hull.

Thereby, the electrical box and/or the battery box are protected from water that may be deposited on the floor.

Preferably, in this electrically powered watercraft, the electrical box has a substantially vertical side wall and the electric component is mounted on the side wall.

Thereby, the electric component is protected from water that may be deposited on the floor. and the interior of the electrical box and/or the battery box can be favorably ventilated.

Preferably, in this electrically powered watercraft, an upper surface of the storage compartment forms an operator's seat.

The storage compartment can serve both as a storage space for the electrical box, and the seat for the operator.

Preferably, in this electrically powered watercraft, the storage compartment is one of a pair of storage compartments positioned symmetrically to a central longitudinal axis of the hull.

Thereby, the electrical box and the battery box can be positioned either on the left side or the right side of the hull according to the preference of the user, and the commercial value of the watercraft can be increased.

The present invention thus provides electrically powered watercraft having an improved wiring arrangement.

BRIEF DESCRIPTION OF THE DRAWING(S)

DESCRIPTION OF THE PREFERRED EMBODIMENT(S)

Preferred embodiments of the present invention will be described in the following with reference to the appended drawings.

Figure 1:
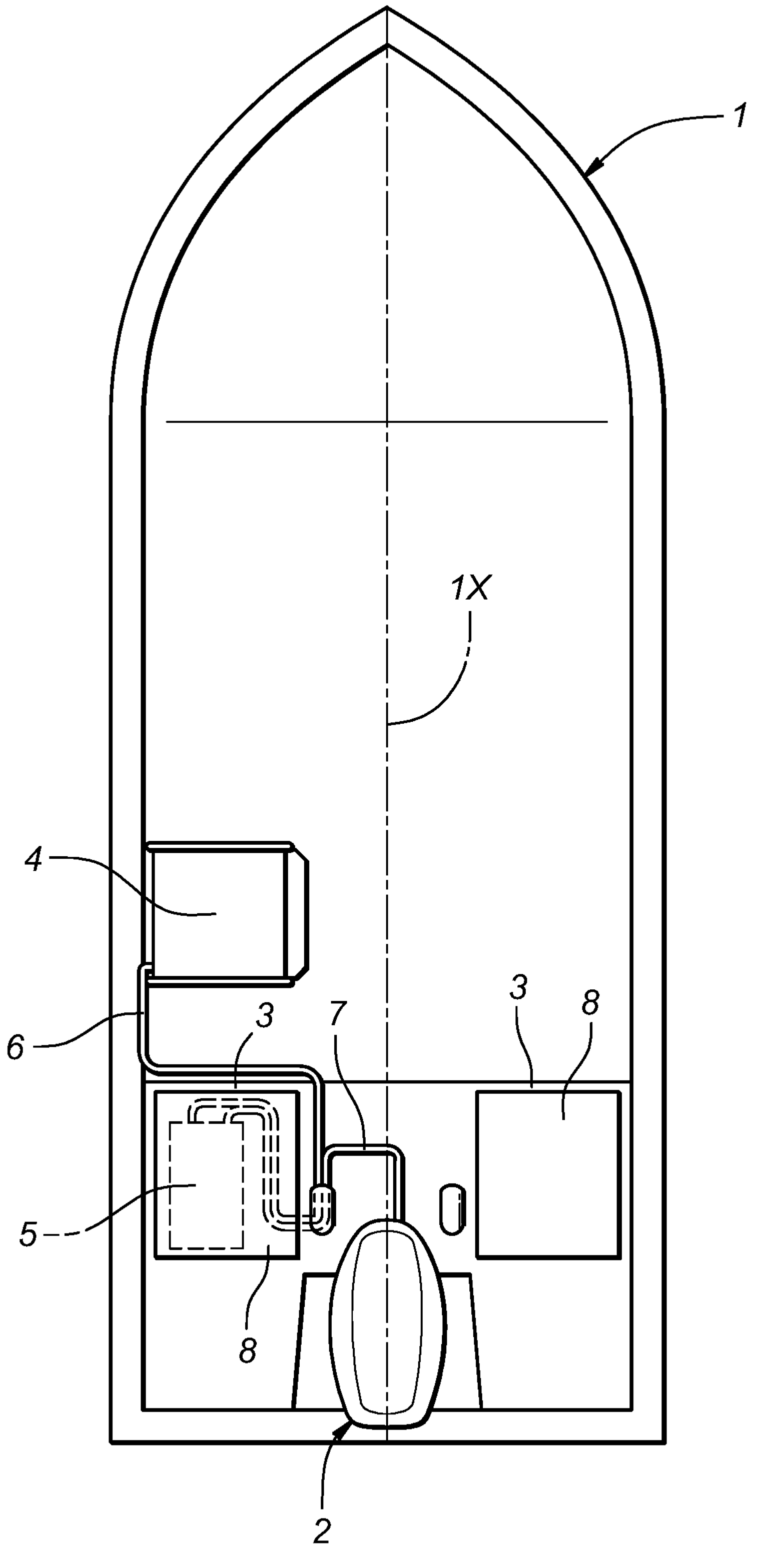
FIG. 1 is a simplified top view of watercraft according to an embodiment of the present invention.

FIG. 1 shows a boat as an electrically powered watercraft including a hull 1 and an outboard motor 2 as a propulsion device fitted to a rear end part of the hull 1. The boat is provided with a pair of storage compartments 3 on either side of the hull 1 immediately in front of the outboard motor 2. Two storage compartments 3 are positioned symmetrically to a central longitudinal axis 1X of the hull 1. In the illustrated embodiment, the storage compartments 3 are formed as parts of a box-shaped structure extending substantially over the entire width of the hull 1 in a rear end part of the hull 1 immediately in front of the outboard motor 2. In the illustrated embodiment, the storage compartments 3 are provided on either lateral end of the box-shaped structure, and are each provided with a hatch door 8 in the top end thereof which may be swung upward to allow access into the storage compartment 3. The hinge axis of the hatch door 8 may extend laterally along a rear part of the storage compartment 3. The part of the box-shaped structure located between the hatch doors 8 may have a fixed top wall part.

An electrical box 5 accommodating electric components therein is positioned inside the storage compartment 3 on the left side of the hull 1. A battery box 4 is positioned on the left side of the hull 1 adjacent to the gunwale on the left side and at a certain distance from the front end of the storage compartment 3. The height of the top end of the storage compartment 3 is selected so as to comfortably seat an operator thereon. The operator seated on top of the storage compartment is able to steer or otherwise operate the outboard motor 2. In other words, an upper surface of the storage compartments 3 forms an operator's seat. The space between the battery box 4 and the storage compartment 3 is dimensioned so as not to interfere with the legs of the operator who is seated on the storage compartment 3.

A first cable 6 extends from the battery box 4 to the electrical box 5, and a second cable 7 extends from the electrical box 5 to the outboard motor 2. The first cable 6 and the second cable 7 are electric cables.

Figure 2:
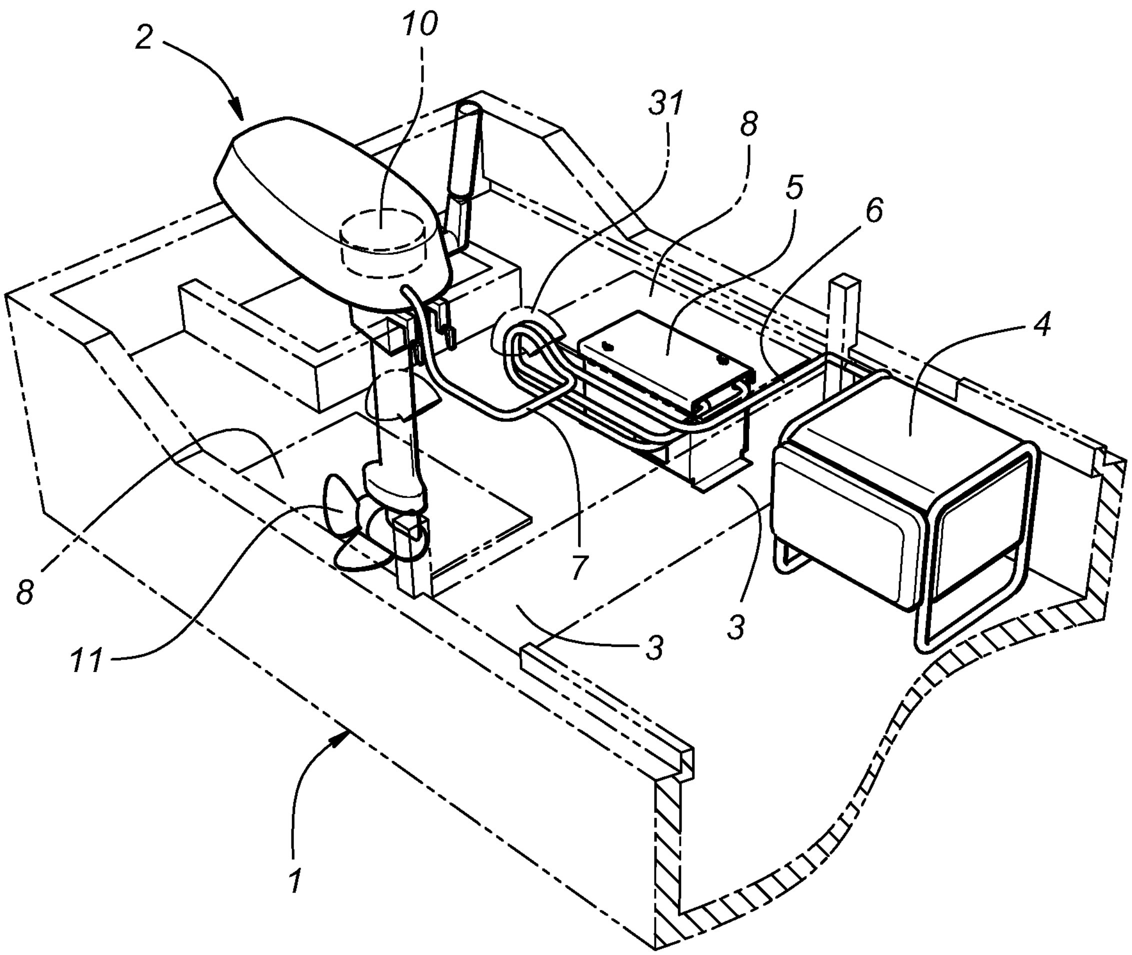
FIG. 2 is a fragmentary perspective view of a rear part of the watercraft.

As shown in FIG. 2, the outboard motor 2 includes a propeller 11 as a propulsion unit positioned in a lower end part of the outboard motor 2 so as to be submerged in the water, and an electric motor 10 provided in an upper part of the outboard motor 2, and has an output shaft (not shown in the drawings) which is connected to the propeller 11 in a power transmitting relationship.

Figure 3:
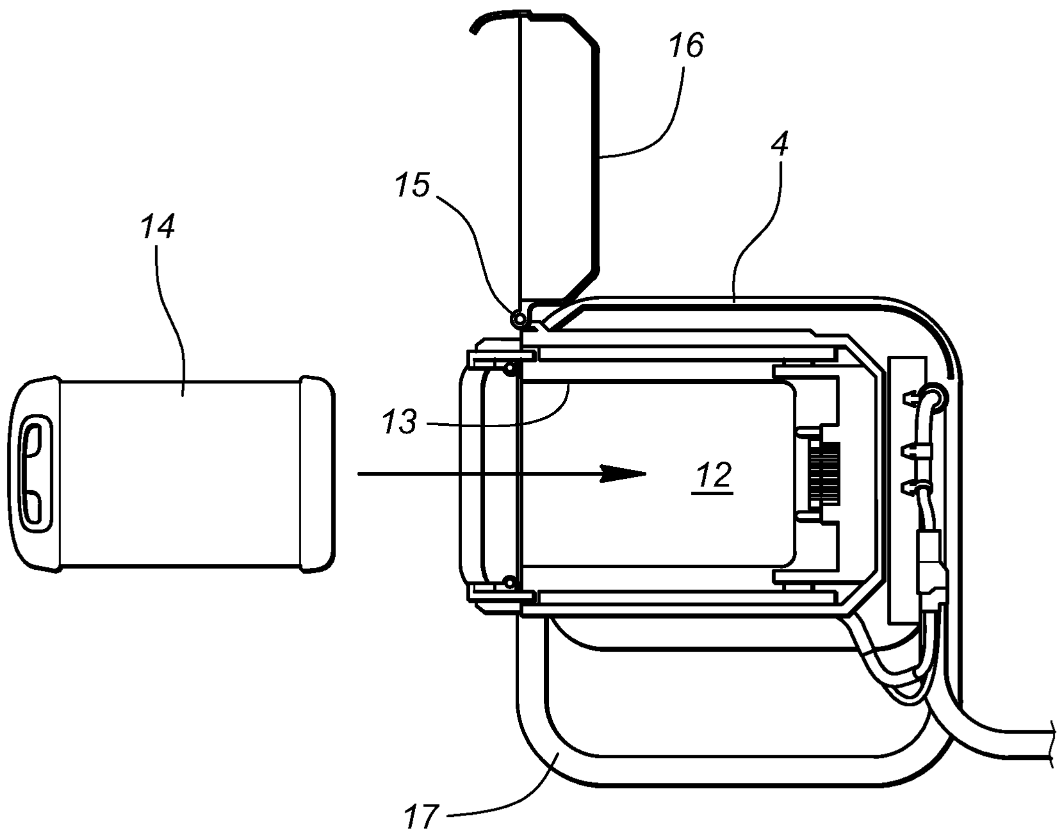
FIG. 3 is a side view of the battery box illustrating the mode of use thereof.

As best shown in FIG. 3, the battery box 4 has a battery receiving opening 13 that faces inboard, and internally defines a battery receiving chamber 12 for receiving a pair of batteries 14 one next to the other. The battery box 4 is fitted with a door 16 via a hinge 15 having a hinge axis extending along the upper edge of the battery receiving opening 13 or in the fore and aft direction. That is, the door 16 is configured to be opened and closed about the hinge axis of the hinge 15. The battery box 4 is further provided with a pair of legs 17 that space the bottom end of the battery box 4 from the floor or deck of the hull 1. In the illustrated embodiment, the legs 17 are parts of a pipe frame that serves as the main structure of the battery box 4. The battery box 4 is formed by plastic panels secured to this pipe frame.

Figure 4:
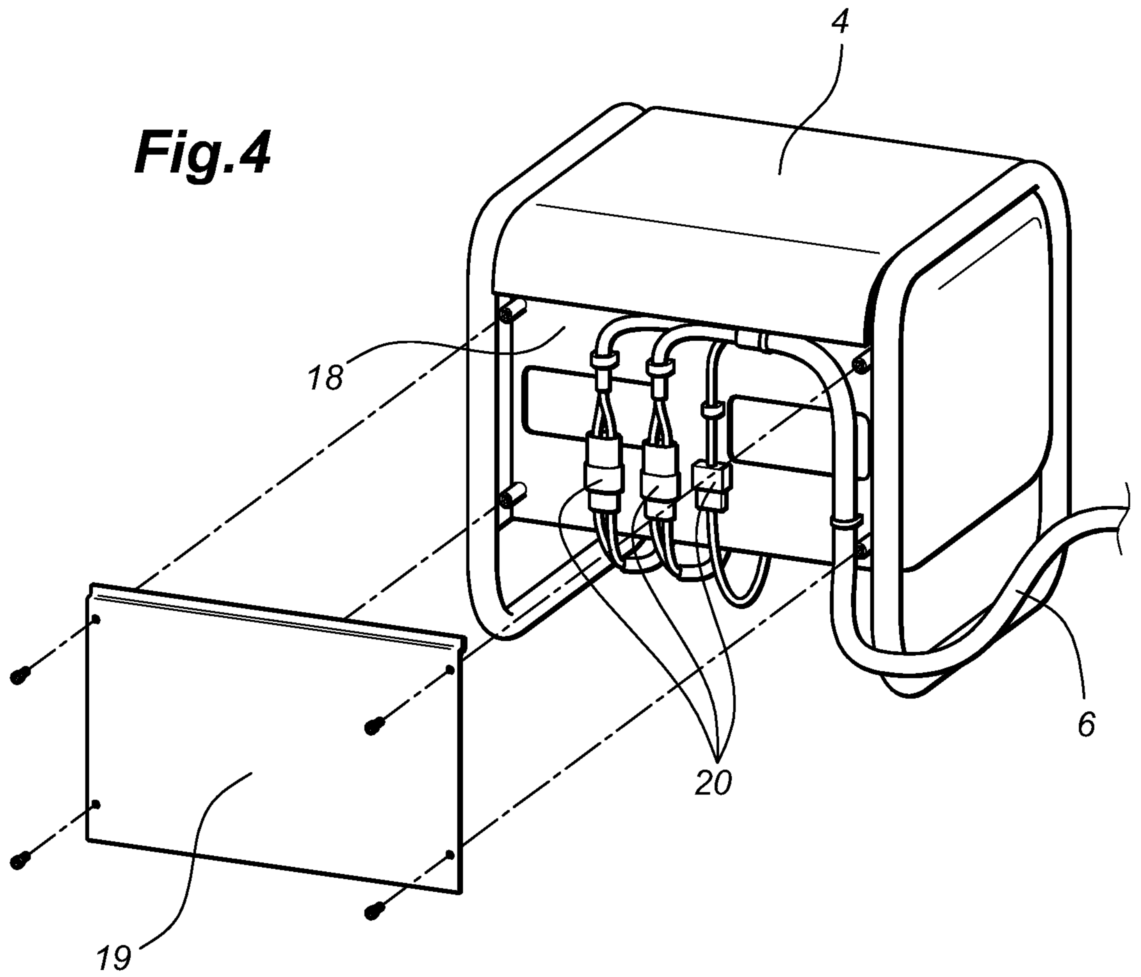
FIG. 4 is an exploded perspective rear view of the battery box.

FIG. 4 shows the battery box 4 from the rear. The rear side or the outboard side of the battery box 4 is provided with an inner wall 18 consisting of a vertical wall which extends vertically, and is permanently attached to the main frame of the battery box 4, and an outer wall 19 which is detachably attached to the main frame of the battery box 4 via fasteners such as screws. The electric wires that extend from the connectors (not shown in the drawings) for electric connection to the batteries 14 are passed under the lower edge of the inner wall 18, and extend upward along the outer surface of the inner wall 18. The electric wires are provided with connectors 20 in the parts thereof on the outer side (outboard side) of the inner wall 18. These wires are retained to the outer side of the inner wall 18 by fasteners. The electric wires are bundled into the first cable 6, and are drawn out from the lower edge of the outer wall 19. The first cable 6 then extends upward along the outer side of the battery box 4 to an elevated position thereof, and passed along the gunwale and the storage compartments 3 at a certain height from the floor of the hull 1.

Figure 5:
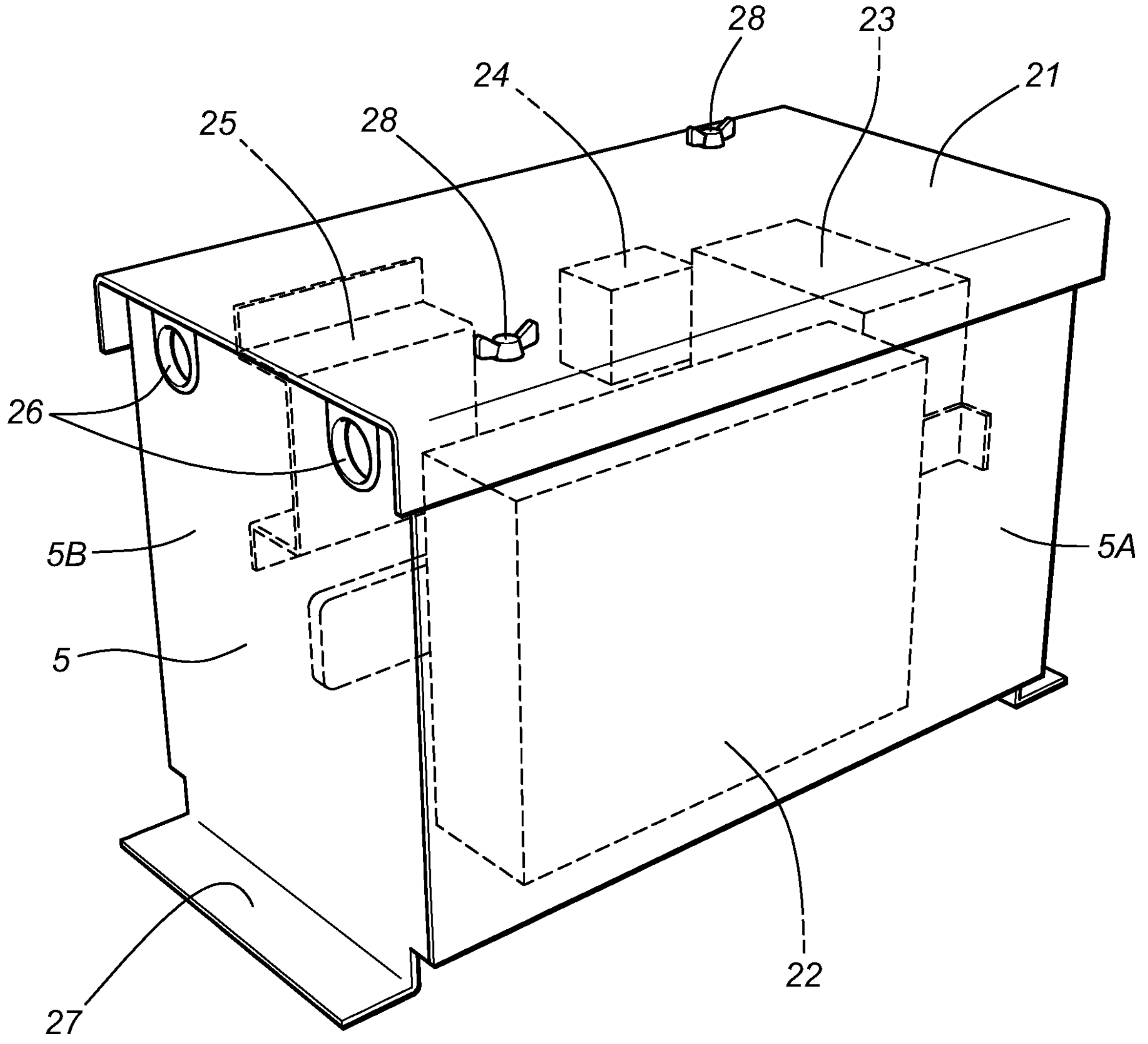
FIG. 5 is a see-through perspective view of the electrical box.
Figure 7:
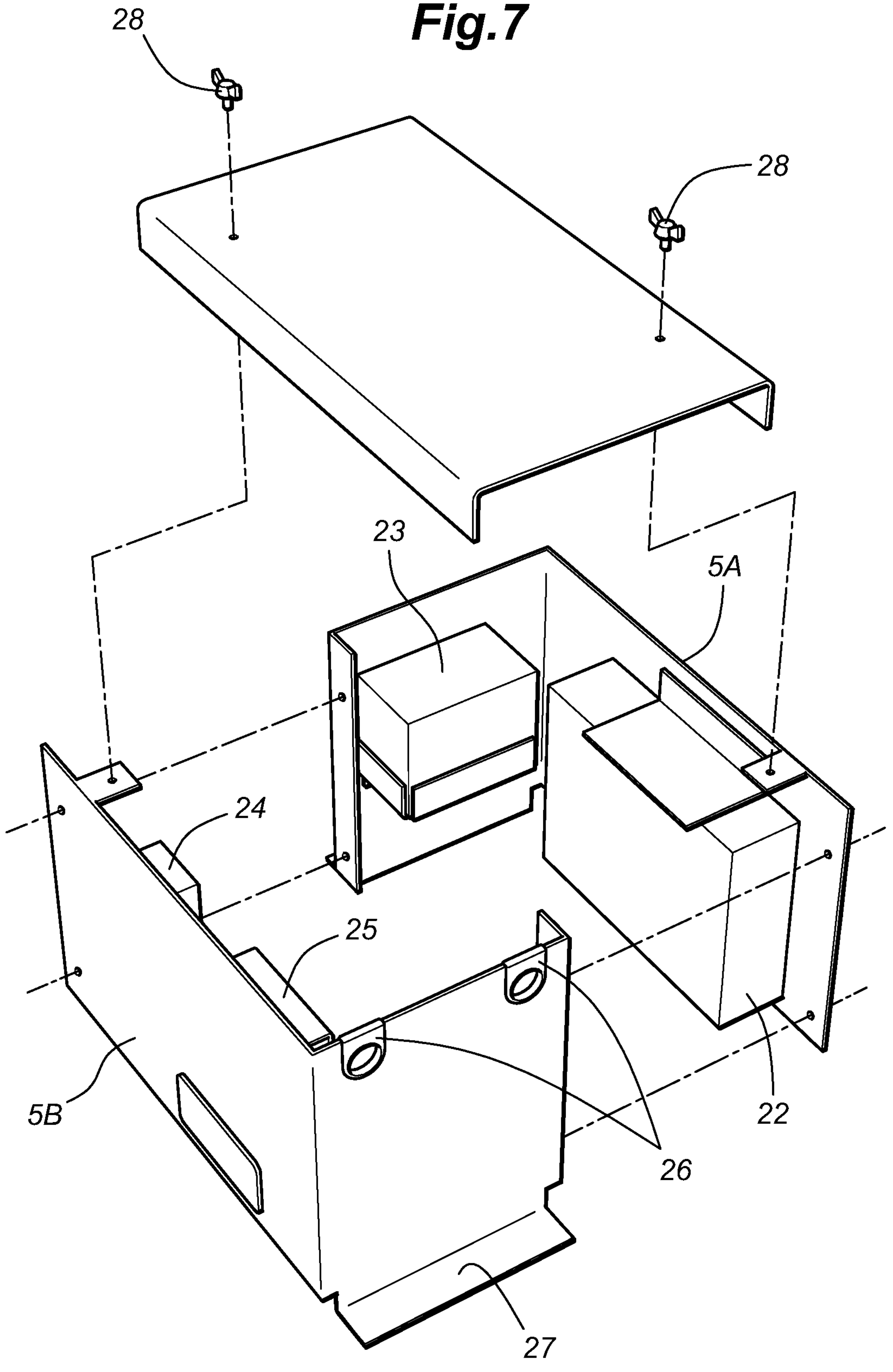
FIG. 7 is an exploded perspective view of the electrical box.

FIG. 5 shows the electrical box 5 which is made of sheet metal in the illustrated embodiment. As shown in FIG. 7, the electrical box 5 consists of two halves 5A and 5B consisting of substantially vertical side walls each having an L-shape in top view, and joined to each other by screws into a box-shape which is elongated in one direction. Each of the halves 5A and 5B is formed by a sheet metal member bent at substantially right angle. The lower edge of the electrical box 5 is raised from the floor of the hull 1 by a pair of legs 27 formed as localized lower extensions of the electrical box 5. The lower edge of each leg 27 is formed with an external flange which may be used to fasten the electrical box 5 to the floor of the hull 1.

Figure 6:
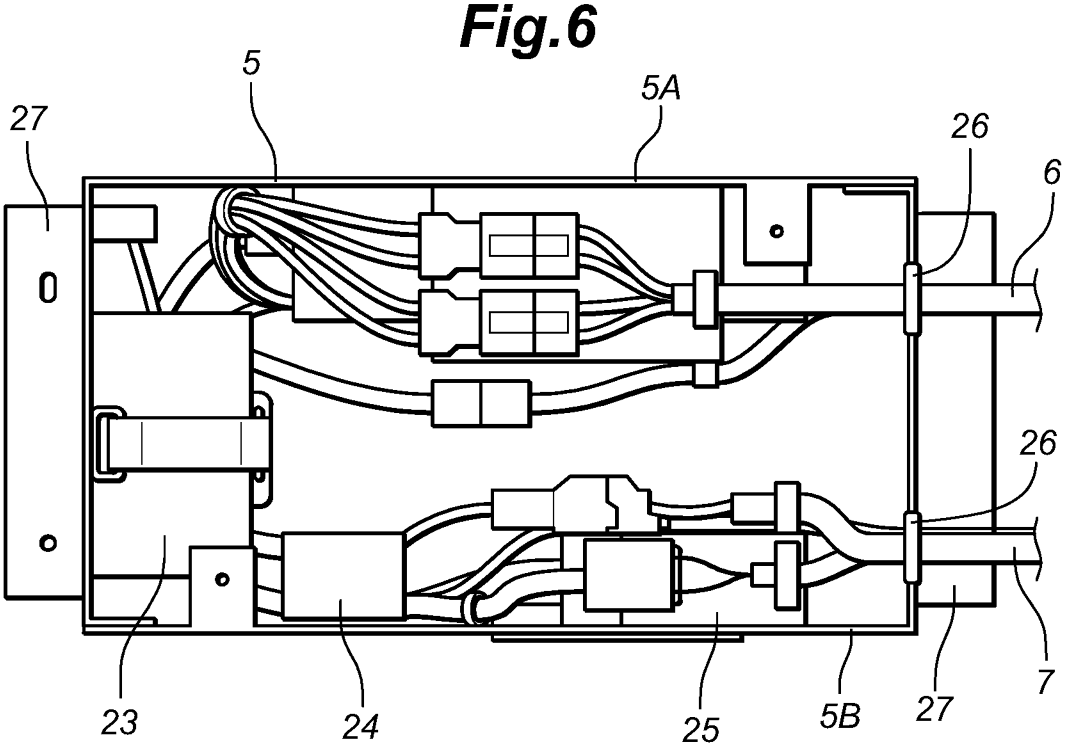
FIG. 6 is a front view of the diagnosis connector box provided in the electrical box.

The electric components accommodated in the electrical box 5 include a power control unit 22 incorporated with power control devices and attached to the long side of the first half 5A of the electrical box 5, a 12 volt battery 23 attached to the short side of the first half 5A of the electrical box 5, a fuse box 24 attached to the long side of the second half 5B of the electrical box 5, and a connector box 25 supporting (or accommodating) electric connectors for connecting an external diagnosis device therein, and also attached to the long side of the second half 5B of the electrical box 5. These electric components are attached to the inner side of the electrical box 5. The upper edge of the short side of the second half 5B of the electrical box 5 is provided with a pair of notches each fitted with a grommet 26 through which the first cable 6 and the second cable 7 extend. The upper end of the electrical box 5 is closed by a top cover 21 which is detachably secured to the top end of the electrical box 5 by wing nuts 28. The top cover 21, when placed, abuts against the upper ends of the grommets 26, and helps the grommets to be secured in place. FIG. 6 shows the interior of the connector box 25 containing electric connectors.

The first cable 6 electrically connects the electric component in the electrical box 5 to the battery 14 in the battery box 4, and the second cable 7 electrically connects the electric component in the electrical box 5 to the electric motor 10 of the outboard motor 2.

Figure 8:
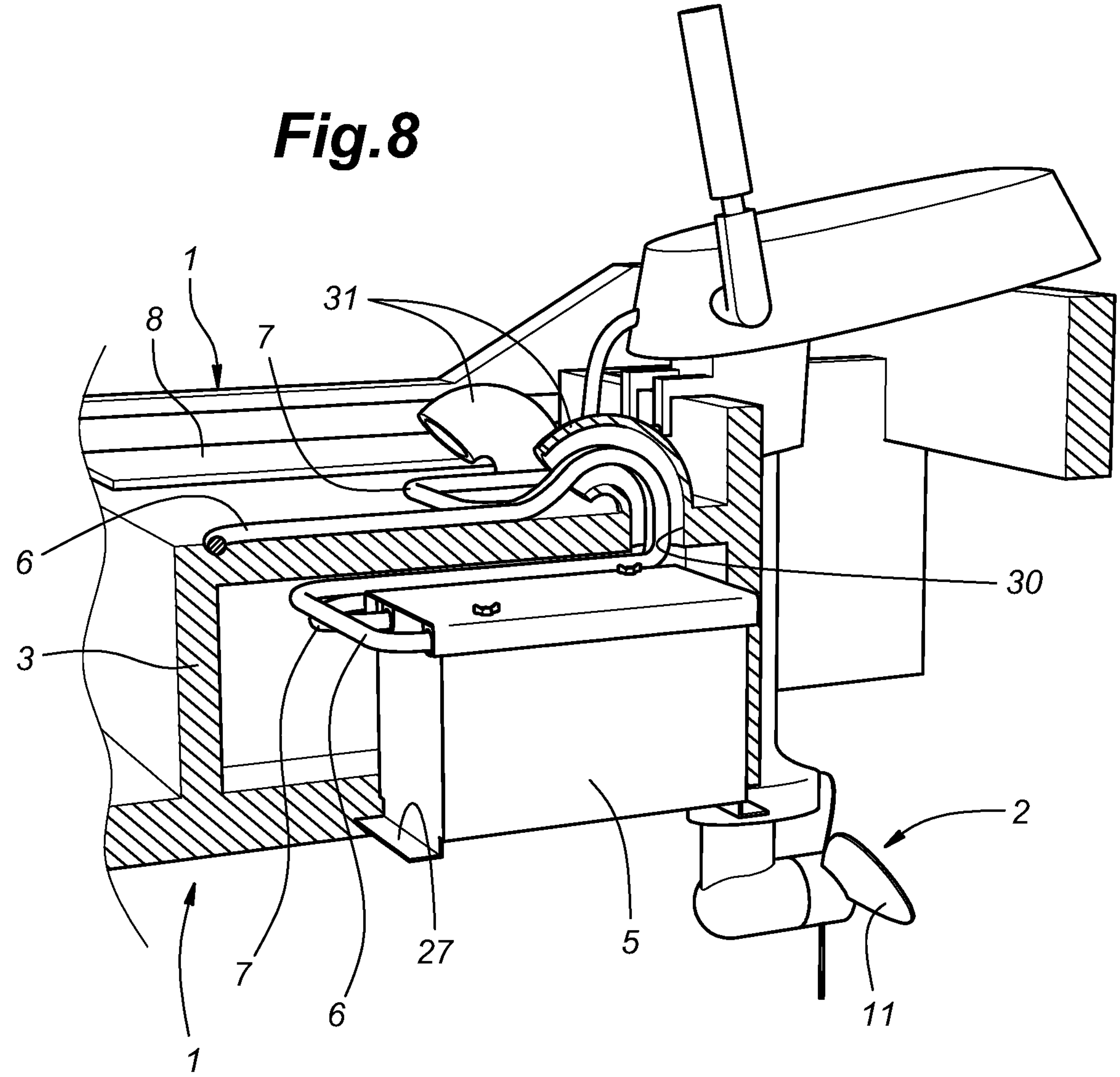
FIG. 8 is a fragmentary sectional view of a left rear part of the watercraft showing the electrical box and the second cable in greater detail.

FIG. 8 shows the layout of the first cable 6 and the second cable 7. The first cable 6 extends from the battery box 4 along the inner side of the gunwale and is led into the storage compartment 3 via a hole 30 formed in the fixed top wall part of the storage compartment 3. The hole 30 is provided with a tubular member 31 or a funnel which is shaped like an inverted letter J or inverted letter U. The base end of the tubular member 31 is fixed to the top wall of the storage compartment 3 so as to communicate with the interior of the storage compartment 3. Since the free end or open end of the tubular member 31 faces substantially downward, water or any other foreign matter is prevented from entering the storage compartment 3 while the cables that are passed through the hole 30 and the tubular member 31 are allowed to move freely inside the hole 30 and the tubular member 31.

The second cable 7 extends from the electrical box 5, and is passed through the hole 30 and the tubular member 31. The second cable 7 drawn out from the tubular member 31 extends to the outboard motor 2, and is electrically connected to the motor 10 thereof. The second cable 7 is given with a necessary amount of slack so that the second cable 7 is not excessively tensioned or bent even when the outboard motor 2 is steered from one extreme end to the other.

Figure 9A:
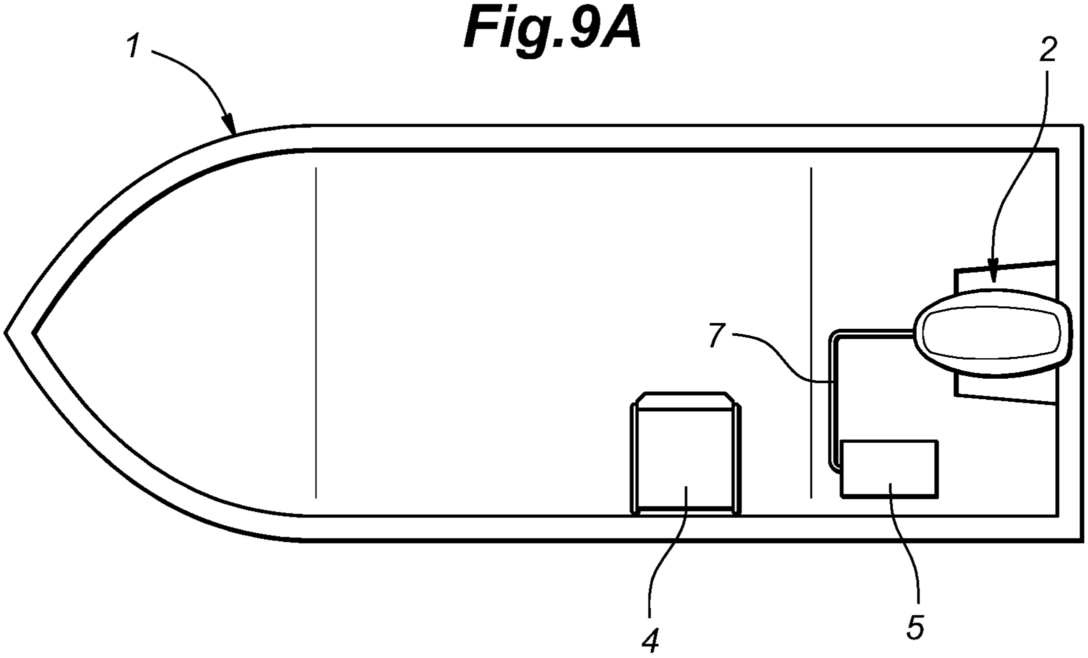
FIG. 9A is a simplified top view of the watercraft showing a first possible arrangement of the second cable.
Figure 9B:
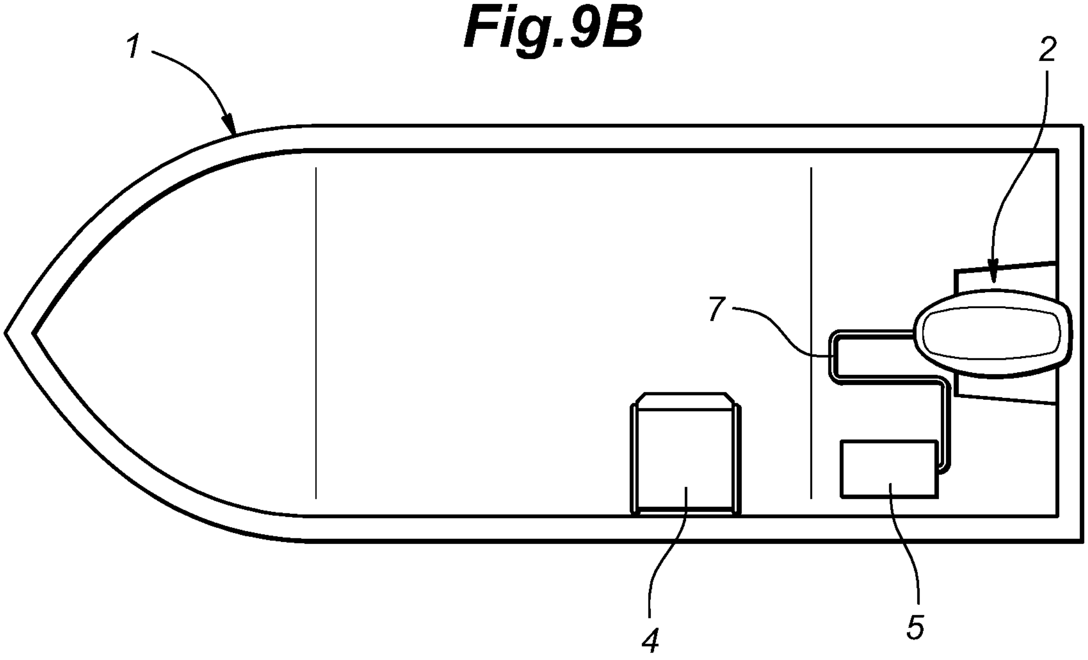
FIG. 9B is a view similar to FIG. 9A showing a second possible arrangement of the second cable.

FIGS. 9A and 9B compare two possible arrangements of the second cable 7. In either case, the electrical box 5 is positioned on a left side part of the hull 1 and slightly ahead of the outboard motor 2. In the case shown in FIG. 9A, the second cable 7 extends from the front end of the electrical box 5 and is connected to the front end of the outboard motor 2 at the other end. In this case, the length of the second cable 7 is comparatively short, but the second cable 7 is required to contain enough slack to allow the outboard motor 2 to be steered from one extreme end to the other. In the case shown in FIG. 9B, the second cable 7 extends from the rear end of the electrical box 5 and is connected to the front end of the outboard motor 2 at the other end. In this case, the second cable 7 extends in a tortuous path so that a large amount of slack can be provided in the second cable 7 without making the second cable 7 unwieldy.

Figure 10:
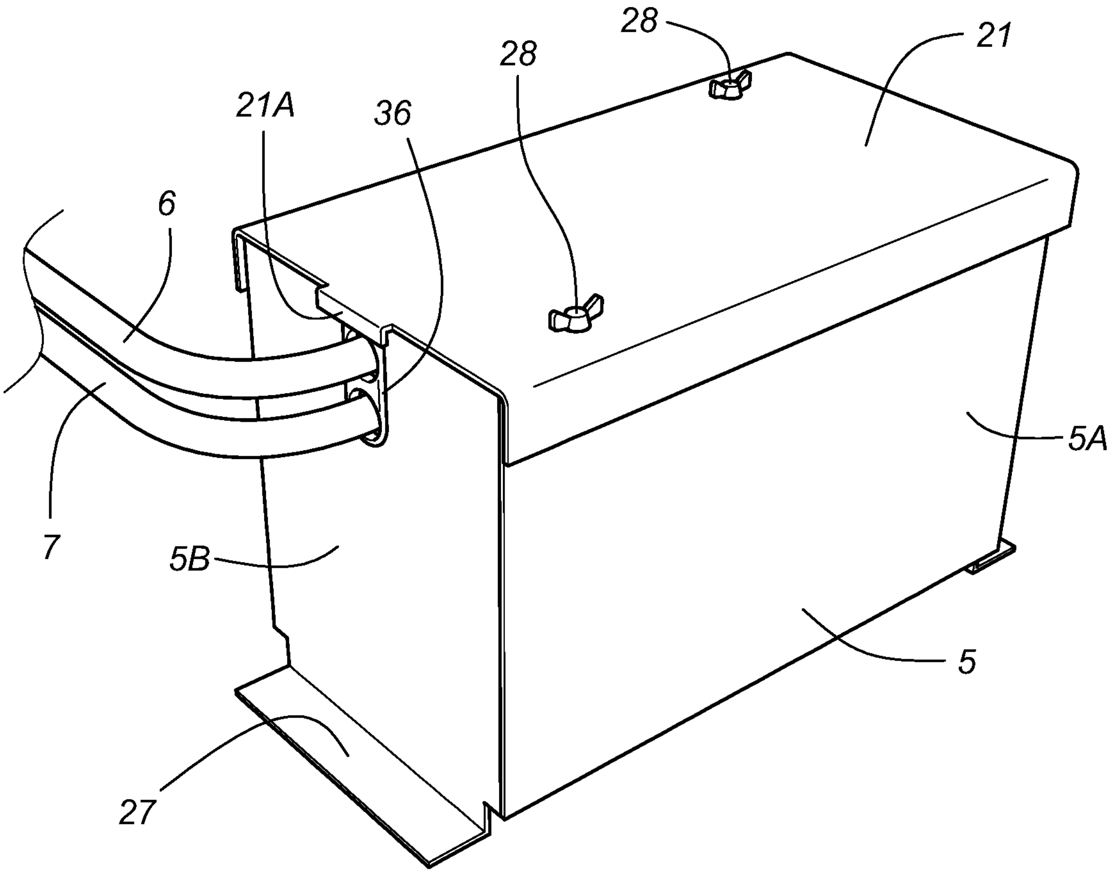
FIG. 10 is a modified embodiment of the arrangement of the parts of the cables extending from the electrical box.

FIG. 10 shows a modified embodiment of the present invention. The first cable 6 and the second cable are drawn out from the electrical box 5 via a single notch in the upper edge of the electrical box 5. This notch receives a single grommet 36 having two openings one above the other; one for the first cable 6, and the other for the second cable 7. The top cover 21 not only presses the grommet 36 from above, but is also provided with a flange 21A which abuts against an outer surface of the upper edge of the grommet 36 from outside. As a result, the grommet 36 is protected from being dislodged from the notch both from above and from outside.

Figure 11:
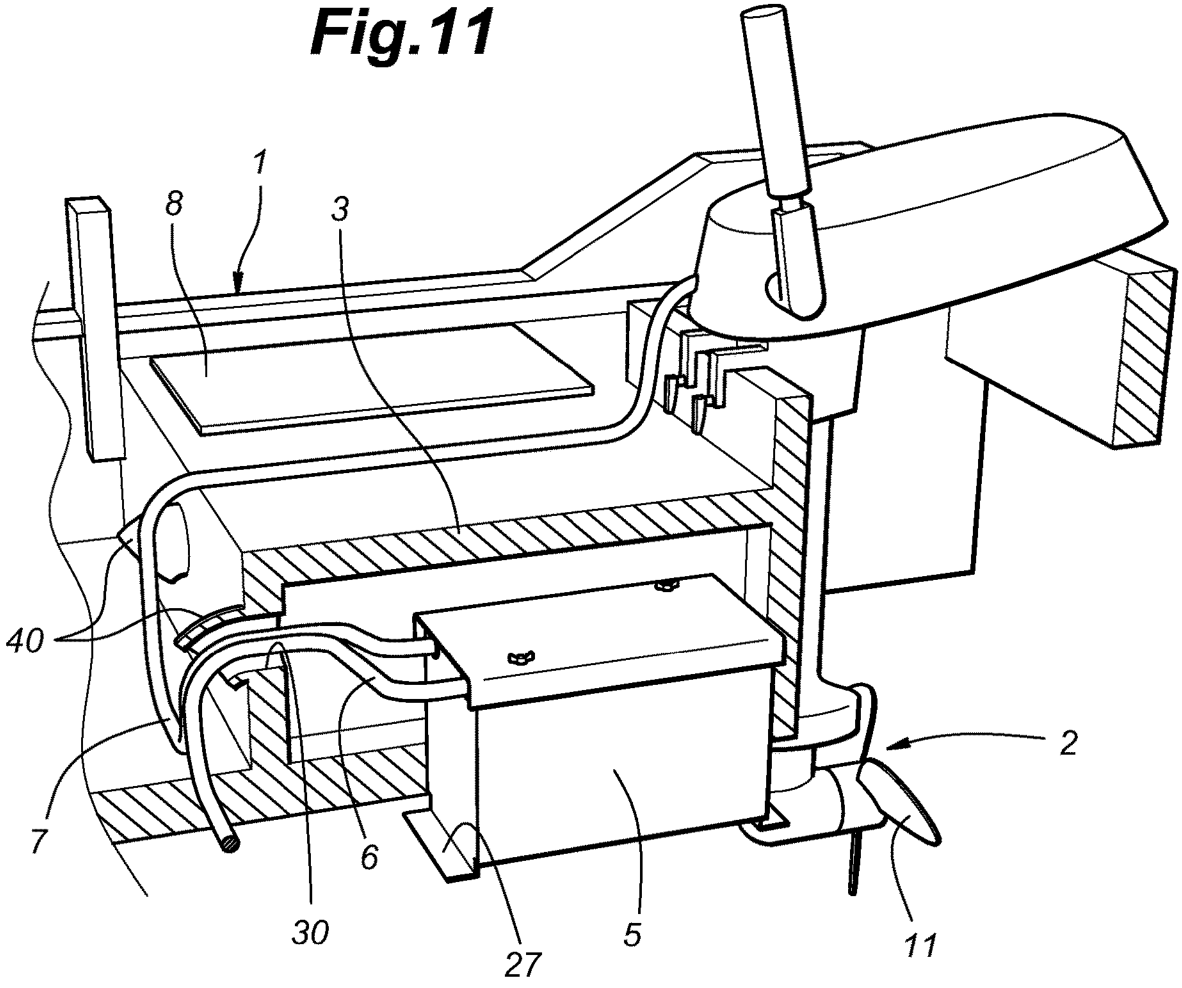
FIG. 11 is a view similar to FIG. 8 showing another modified embodiment of the present invention.

FIG. 11 shows another modified embodiment of the present invention. In this case, the hole 30 for drawing out the first cable 6 and the second cable 7 from the storage compartment 3 is provided on the front wall of the storage compartment 3, instead of the upper wall. This hole 30 is fitted with a tubular member 40 or a funnel which is shaped like letter L or J on its side. The base end of the tubular member 31 is fixed to the front wall of the storage compartment 3 so as to communicate with the interior of the storage compartment 3, and the opposite end or the free end of the tubular member 31 faces substantially downward. Thereby, water or any other foreign matter is prevented from entering the storage compartment 3 while the cables that are passed through the hole 30 and the tubular member 40 are allowed to move freely inside the hole 30 and the tubular member 40.

Figure 12:
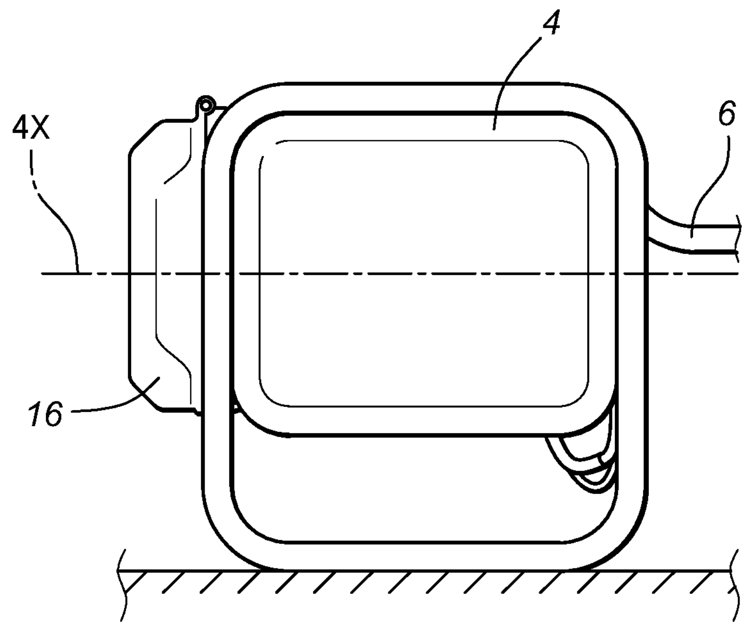
FIG. 12 is a view similar to FIG. 3 showing yet another modified embodiment of the present invention.

FIG. 12 shows yet another modified embodiment of the present invention. In this embodiment, the first cable 6 extends from an elevated position on the outboard side of the battery box 4. More specifically, the battery box 4 has a predetermined height when the door 16 is closed, and the first cable 6 extends from a position on the battery box 4 higher than a horizontal center line 4X passing through a vertically middle point of the battery box 4. In this configuration, the outer wall 19 (see FIG. 4) of the battery box 4 is provided with a hole (not shown in the drawings) for passing through the first cable 6. It is also possible to form a notch on the lower edge or the side edge of the outer wall 19, instead of a hole. Further, the first cable 6 may pass under the outer wall 19, and be fastened to a high point on the pipe frame of the battery box 4 with a zip tie or the like, or additionally or alternatively, the outer wall 19 may have a lower edge which is higher than the lower edge shown in FIG. 4. As a result, the first cable 6 is placed well above the floor of the electrically powered watercraft, so that the first cable 6 is protected from water and is prevented from being trampled on by passengers.

Figure 13A:
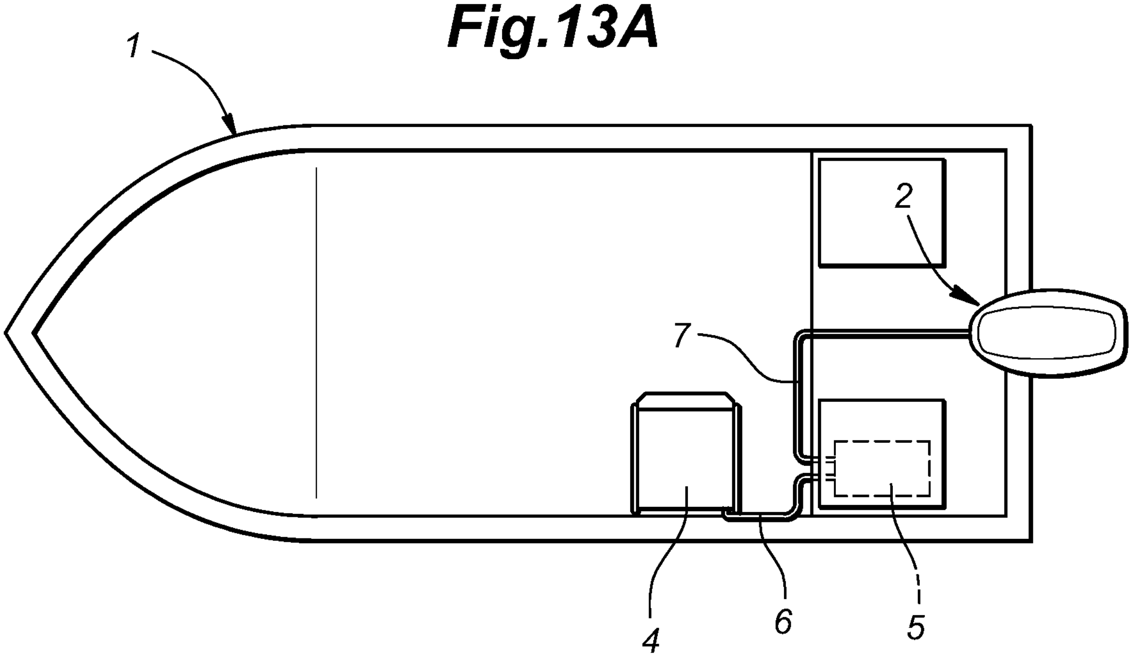
FIGS. 13A and 13B are top views similar to FIGS. 9A and 9B showing other possible arrangements of the cables.
Figure 13B:
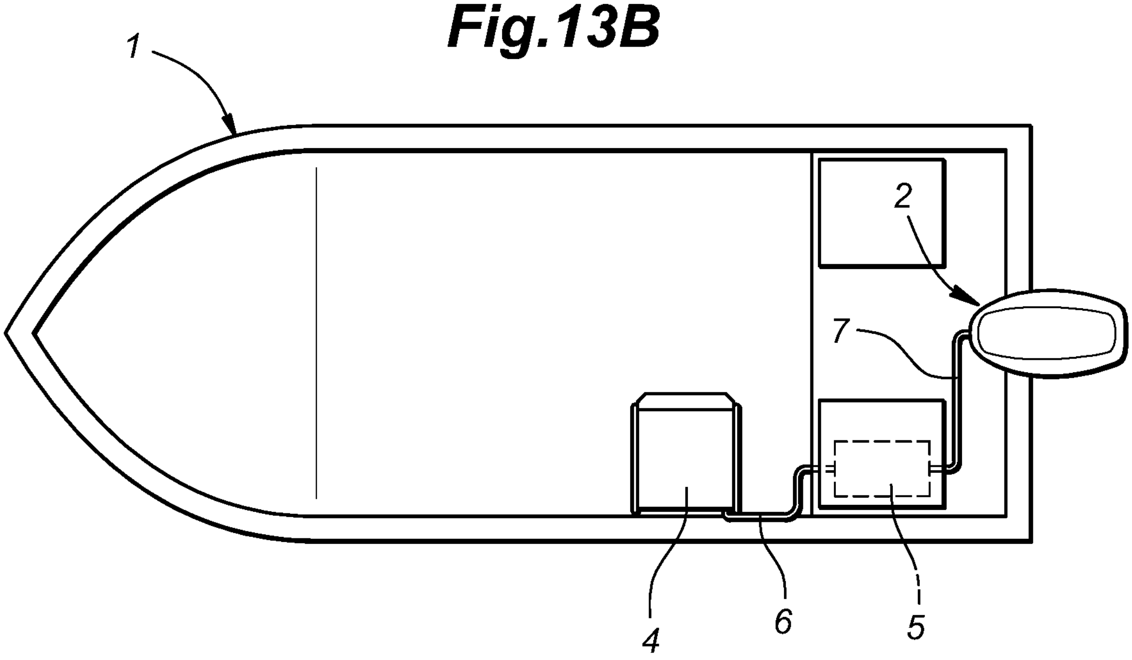

FIGS. 13A and 13B compare two possible arrangements of the first and second cables 6, 7 in yet other modified embodiments of the present invention. In these cases, the outboard motor 2 is mounted further to the rear of the watercraft than in the example shown in FIG. 1, and in particular on the transom of the watercraft. The electrical box 5 is positioned on the left side of the hull 1 and generally ahead of the front end of the outboard motor 2.

In the case shown in FIG. 13A, the first cable 6 extends from the battery box 4 to the front end of the electrical box 5, and the second cable 7 extends from the front end of the electrical box 5 to the front end of the outboard motor 2 at the other end thereof. The front end of the electrical box 5 may be fitted with a pair of grommets 26 (FIG. 5) or one grommet 36 (FIG. 10) defining two cable insertion holes at the front end of the electrical box 5. In this case, the length of the second cable 7 increases, but an advantage that the second cable 7 is given with a large amount of slack can be obtained. In the case shown in FIG. 13B, the first cable 6 extends from the battery box 4 to the front end of the electrical box 5 in a similar fashion, but the second cable 7 extends from the rear end of the electrical box 5 to the front end of the outboard motor 2. A grommet 26 (FIG. 5) is provided at each of the front end and the rear end of the electrical box 5. In this case, the length of the second cable 7 can be minimized.

Figure 14:
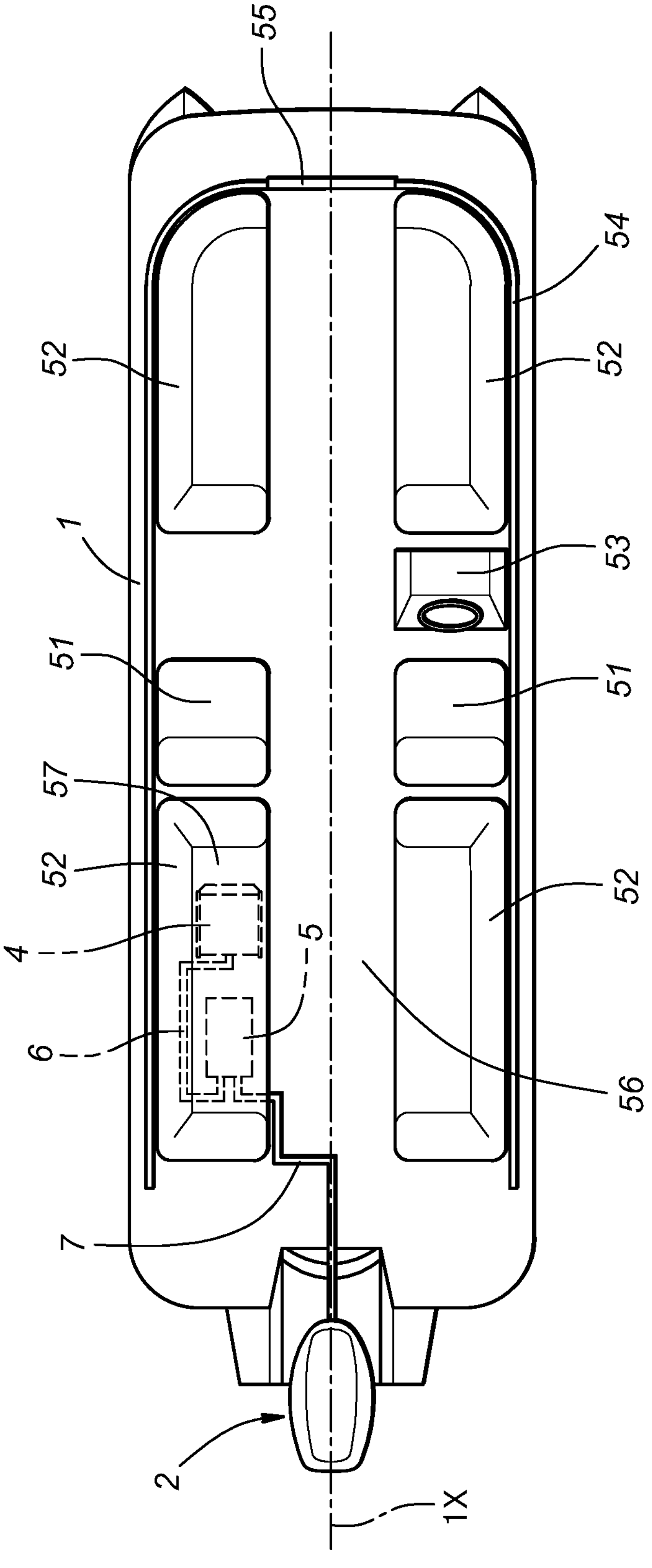
FIG. 14 is a simplified top view of watercraft according yet another modified embodiment of the present invention.

FIG. 14 shows a pontoon given as electric watercraft according to another modified embodiment of the present invention. The pontoon includes a substantially rectangular hull 1 and an outboard motor 2 attached to the rear end (stern) of the hull 1. The hull 1 is provided with a pair of individual seats 51 in a longitudinally middle part of the hull 1 on either side of the hull 1, the right seat serving as a driver's seat, and the left seat as an assistant seat. The hull 1 is additionally provided with four bench seats 52 along either side of the hull 1, two ahead of the individual seats 51, and the remaining two behind the individual seats 51. A driving unit 53 including a steering wheel and an instrument panel is provided immediately in front of the individual seat serving as the driver's seat. The deck of this pontoon is surrounded by railing 54, and a front end part of the railing 54 is fitted with a door 55 for boarding and unboarding the pontoon. The bench seats 52 on either side oppose each other, and a laterally central part of the hull 1 between the opposing bench seats 52 serves as a passage way 56 for the crew and passengers to walk through. The rear end part of the hull 1 may be fitted with a retractable roof (not shown in the drawings).

The seat bottom of one of the bench seats 52 (the left rear bench seat 51 in this case) internally defines a storage compartment 57 that houses a battery box 4 and an electrical box 5. Thus, in this case, not only the electrical box 5 but also the battery box 4 are placed in a substantially enclosed space defined inside the storage compartment 57. The electrical box 5 is positioned behind the battery box 4, and the outboard motor 2 is positioned behind the electrical box 5. A first cable 6 extends from the rear end of the battery box 4 to the rear end of the electrical box 5, and a second cable 7 extends from the rear end of the electrical box 5 to the front end of the outboard motor 2. Alternatively, the first cable 6 may extend from the front end of the electrical box 5.

In this case also, the battery box 4 and the electrical box 5 are formed separately, but since the two boxes as well as the most part of the cables are housed in the storage compartment 57 the movement of people is not hindered, and the operation and maintenance of the pontoon can be performed satisfactory manner. Further, the second cable 7 can be arranged such that the lateral steering swing motion of the outboard motor 2 is not hampered by the second cable 7.

The present invention has been described in terms of a specific embodiment, but the present invention is not limited by such an embodiment and can be modified in various ways without departing from the scope of the present invention. For instance, the box-like structure in the rear end part of the hull 1 is provided with a pair of hatch doors 8 in the foregoing embodiment, but the top wall of the entire box-like structure may also be entirely fixed, and the access into the storage compartments 3 may be gained by a door or door provided in the front wall of the box-like structure. In the above embodiments, the present invention is applied to boats and pontoons, but the electric watercraft according to the present invention is not limited to these examples, and may also be cabin boats, offshore boats, center console boats, runabouts, and other boats. The propulsion device is not limited to the outboard motor 2, but may also be an inboard/outboard motor. Alternatively, the battery box 4 and the electrical box 5 may be arranged on the different sides of the hull 1, and the watercraft may be fitted with two or more electric propulsion devices positioned one next to the other.

Moreover, not all of the constituent elements shown in the above embodiments are essential to the broad concept of the present invention, and they can be appropriately selected, omitted and substituted without departing from the gist of the present invention. The contents of any cited references in this disclosure will be incorporated in the present application by reference.

The invention claimed is:

1. An electrically powered watercraft, comprising:

a hull;

a propulsion device provided at a stern of the hull and including a motor and a propulsion unit driven by the motor;

an electrical box that is placed on of the hull and houses an electric component therein;

a battery box for housing a battery for supplying electric power for driving the motor, the battery box being positioned at a predetermined distance in front of away from the electrical box;

a first cable extending from the battery box to the electrical box; and a second cable extending from the electrical box to the motor, wherein a substantially closed box-shaped storage compartment is provided on the hull, and accommodates the electrical box therein, and the first cable and the second cable are passed through a hole formed in a wall of the storage compartment.

2. The electrically powered watercraft according to claim 1, wherein the first cable and the second cable extend forward from the hole, and an end of the second cable on a side of the propulsion device extends forward from the propulsion device.

3. The electrically powered watercraft according to claim 2, wherein an end of the second cable on a side of the electrical box extends rearward from a rear end of the electrical box.

4. The electrically powered watercraft according to claim 1, wherein the hole is provided in a top wall of the storage compartment, and fitted with an inverted J-shaped or inverted U-shaped tubular member provided on the top wall of the storage compartment.

5. The electrically powered watercraft according to claim 1, wherein the hole is provided in a front wall of the storage compartment, and fitted with a downwardly open L-shaped or J-shaped tubular member provided on the front wall of the storage compartment.

6. The electrically powered watercraft according to claim 1, wherein the first cable extends from a high position on an outboard side of the battery box, the high position being a position on the battery box higher than a horizontal center line passing through a vertically middle point of the battery box.

7. The electrically powered watercraft according to claim 1, wherein the battery box has an open bottom and a vertical wall provided on an outboard side of the battery box, and an end of the first cable on a side of the battery box passes under the vertical wall, and is retained on an outboard surface of the vertical wall.

8. The electrically powered watercraft according to claim 1, wherein the battery box has a battery receiving opening facing an inboard side of the hull, and a door that is configured to be opened and closed about an axis extending along an upper edge of the battery receiving opening.

9. The electrically powered watercraft according to claim 1, wherein the electrical box and/or the battery box has legs for separating a bottom end thereof from a floor of the hull.

10. The electrically powered watercraft according to claim 1, wherein the electrical box has a substantially vertical side wall and the electric component is mounted on the side wall.

11. The electrically powered watercraft according to claim 1, wherein an upper surface of the storage compartment is configured to seat an operator thereon.

12. The electrically powered watercraft according to claim 1, wherein the storage compartment is one of a pair of storage compartments positioned symmetrically to a central longitudinal axis of the hull.

13. The electrically powered watercraft according to claim 7, wherein the electrical box is placed on one side of the hull.

14. The electrically powered watercraft according to claim 11, wherein a height of the upper surface of the storage compartment is selected so as to seat the operator thereon.

15. The electrically powered watercraft according to claim 1, wherein the propulsion device is an outboard motor.

16. An electrically powered watercraft, comprising:

a hull;

a propulsion device provided at a stern of the hull and including a motor and a propulsion unit driven by the motor;

an electrical box that is placed on the hull and houses an electric component therein;

a battery box for housing a battery for supplying electric power for driving the motor, the battery box being positioned at a predetermined distance away from the electrical box;

a first cable extending from the battery box to the electrical box; and a second cable extending from the electrical box to the motor, wherein the battery box has an open bottom and a vertical wall provided on an outboard side of the battery box, and an end of the first cable on a side of the battery box passes under the vertical wall, and is retained on an outboard surface of the vertical wall.

17. An electrically powered watercraft, comprising:

a hull;

a propulsion device provided at a stern of the hull and including a motor and a propulsion unit driven by the motor;

an electrical box that is placed on the hull and houses an electric component therein;

a battery box for housing a battery for supplying electric power for driving the motor, the battery box being positioned at a predetermined distance away from the electrical box;

a first cable extending from the battery box to the electrical box; and a second cable extending from the electrical box to the motor, wherein the battery box has a battery receiving opening facing an inboard side of the hull, and a door that is configured to be opened and closed about an axis extending along an upper edge of the battery receiving opening.

18. An electrically powered watercraft, comprising:

a hull;

a propulsion device provided at a stern of the hull and including a motor and a propulsion unit driven by the motor;

an electrical box that is placed on the hull and houses an electric component therein;

a battery box for housing a battery for supplying electric power for driving the motor, the battery box being positioned at a predetermined distance from the electrical box;

a first cable extending from the battery box to the electrical box; and a second cable extending from the electrical box to the motor, wherein the electrical box has a substantially vertical side wall and the electric component is mounted on the side wall.

* * * * *